United States Patent
Kim et al.

(10) Patent No.: US 11,100,374 B2
(45) Date of Patent: Aug. 24, 2021

(54) APPARATUS AND METHOD WITH CLASSIFICATION

(71) Applicant: Samsung Electronics Co., Ltd., Suwon-si (KR)

(72) Inventors: Young-Seok Kim, Suwon-si (KR);
Hwidong Na, Seongnam-si (KR);
Seongmin Ok, Yongin-si (KR);
Min-Joong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/671,639

(22) Filed: Nov. 1, 2019

(65) Prior Publication Data

US 2020/0401855 A1 Dec. 24, 2020

(30) Foreign Application Priority Data

Jun. 19, 2019 (KR) .................. 10-2019-0072600

(51) Int. Cl.
*G06K 9/00* (2006.01)
*G06K 9/62* (2006.01)
*G06N 3/04* (2006.01)

(52) U.S. Cl.
CPC ......... *G06K 9/6277* (2013.01); *G06K 9/6221* (2013.01); *G06K 9/6256* (2013.01); *G06K 9/6281* (2013.01); *G06N 3/0454* (2013.01)

(58) Field of Classification Search
CPC ........... G06K 9/00718; G06K 9/00797; G06K 9/6217; G06K 9/03; G06K 9/38;
(Continued)

(56) References Cited

U.S. PATENT DOCUMENTS 4,599,693 A * 7/1986 Denenberg ........... G06K 9/6217
706/12
5,251,131 A * 10/1993 Masand ................. G10L 15/18
704/9
(Continued)

FOREIGN PATENT DOCUMENTS

JP 6095858 B2 3/2017

OTHER PUBLICATIONS

Liu, W. et al., "An Easy-to-Hard Learning Paradigm for Multiple Classes and Multiple Labels", *Journal of Machine Learning Research*, 2017, pp. 1-38 (38 pages in English).
(Continued)

*Primary Examiner* — Amir Alavi
(74) *Attorney, Agent, or Firm* — NSIP Law

(57) ABSTRACT

A processor-implemented classification method includes: determining a first probability vector including a first probability, for each of a plurality of classes, resulting from a classification of an input with respect to the classes; determining, based on the determined first probability vector, whether one or more of the classes represented in the first probability vector are confusing classes; adjusting, in response to one or more of the classes being the confusing classes, the determined first probability vector based on a first probability of each of the confusing classes and a maximum value of the first probabilities; determining a second probability vector including a second probability, for each of the classes, resulting from another classification of the input with respect to the classes; and performing classification on the input based on a result of a comparison between the determined second probability vector and the adjusted first probability vector.

26 Claims, 13 Drawing Sheets

(58) Field of Classification Search
CPC .. G06K 9/6291; G06K 9/6216; G06K 9/6296; G06K 9/72; G06K 9/6277; H04N 1/40062; G06F 17/30257; G06F 17/3024; G06F 17/3072; G06T 5/001
See application file for complete search history.

(56) References Cited

U.S. PATENT DOCUMENTS

| | | | | |
|---|---|---|---|---|
| 5,339,365 | A * | 8/1994 | Kawai | H04N 1/40062 |
| | | | | 382/176 |
| 5,768,422 | A * | 6/1998 | Yaeger | G06K 9/6217 |
| | | | | 382/157 |
| 5,774,581 | A * | 6/1998 | Fassnacht | G06K 9/00973 |
| | | | | 382/171 |
| 6,226,409 | B1 * | 5/2001 | Cham | G06K 9/6217 |
| | | | | 382/228 |
| 6,594,392 | B2 * | 7/2003 | Santoni | G06K 9/6217 |
| | | | | 382/119 |
| 6,937,994 | B1 * | 8/2005 | Iyengar | G06Q 30/02 |
| | | | | 705/7.29 |
| 7,773,789 | B2 * | 8/2010 | Rousson | G06K 9/72 |
| | | | | 382/128 |
| 8,306,940 | B2 | 11/2012 | Lee et al. | |
| 8,595,153 | B2 | 11/2013 | Drucker et al. | |
| 9,213,885 | B1 * | 12/2015 | Schneiderman | G06K 9/6282 |
| 9,704,054 | B1 | 7/2017 | Tappen et al. | |
| 9,972,092 | B2 * | 5/2018 | Lin | G06K 9/38 |
| 10,062,008 | B2 | 8/2018 | Heusch et al. | |
| 10,102,454 | B2 | 10/2018 | Merler et al. | |
| 2010/0241596 | A1 | 9/2010 | Lee et al. | |
| 2011/0307422 | A1 | 12/2011 | Drucker et al. | |
| 2015/0356461 | A1 | 12/2015 | Vinyals et al. | |
| 2016/0110630 | A1 | 4/2016 | Heusch et al. | |
| 2016/0132786 | A1 | 5/2016 | Balan et al. | |
| 2018/0089543 | A1 | 3/2018 | Merler et al. | |
| 2018/0150728 | A1 | 5/2018 | Vahdat | |
| 2018/0307946 | A1 | 10/2018 | Kuroda et al. | |
| 2020/0175279 | A1 * | 6/2020 | Chen | G06K 9/03 |
| 2020/0327445 | A1 * | 10/2020 | Yu | G06N 20/00 |

OTHER PUBLICATIONS

Chen, J. et al., "Selective Learning Confusion Class for Text-Based CAPTCHA Recognition", *SLCC for Text-Based CAPTCHA Recognition*, vol. 7, pp. 22246-22259 (14 pages in English).

* cited by examiner

| Probability | 0.00 | 0.00 | 0.71 | 0.00 | 0.29 |
|---|---|---|---|---|---|
| Class ID | 0 | 1 | 2 | 3 | 4 |

APPARATUS AND METHOD WITH CLASSIFICATION

CROSS-REFERENCE TO RELATED APPLICATIONS

This application claims the benefit under 35 USC § 119(a) of Korean Patent Application No. 10-2019-0072600 filed on Jun. 19, 2019 in the Korean Intellectual Property Office, the entire disclosure of which is incorporated herein by reference for all purposes.

BACKGROUND

1. Field

The following description relates to an apparatus and method with classification.

2. Description of Related Art

When an input is transmitted to a classifier, the classifier may calculate, for each class, a probability that the class corresponds to an in-domain. When a maximum value of the calculated probabilities is greater than or equal to a threshold, the classifier may classify the input into a class having the maximum value. When the maximum value is less than the threshold, the classifier may determine that the input corresponds to an out-of-domain (OOD). However, for a typical classifier, even when the typical classifier determines that the input corresponds to the OOD, the input may actually belong to the class having the maximum value. For example, in the typical classification apparatus, even though the input of the classifier actually belongs to one of the classes corresponding to the in-domain, the typical classifier may incorrectly determine the input to be the OOD when the maximum value is less than the threshold. As such, the typical classifier may have a relatively low classification accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented classification method includes: determining a first probability vector including a first probability, for each of a plurality of classes, resulting from a classification of an input with respect to the classes; determining, based on the determined first probability vector, whether one or more of the classes represented in the first probability vector are confusing classes; adjusting, in response to one or more of the classes being the confusing classes, the determined first probability vector based on a first probability of each of the confusing classes and a maximum value of the first probabilities; determining a second probability vector including a second probability, for each of the classes, resulting from another classification of the input with respect to the classes; and performing classification on the input based on a result of a comparison between the determined second probability vector and the adjusted first probability vector.

The determining of whether one or more of the classes represented in the first probability vector are the confusing classes may include: determining whether the maximum value is less than or equal to a first threshold; and in response to determining that the maximum value is less than or equal to the first threshold, determining whether one or more of the classes represented in the first probability vector are the confusing classes.

The confusing classes may be classes corresponding to first probabilities of the first feature vector that are greater than zero, other than a class corresponding to the maximum value.

The determining of whether one or more of the classes represented in the first probability vector are the confusing classes may include: determining whether one or more of the first probabilities of the first feature vector, other than the maximum value, are greater than or equal to a second threshold; and in response to determining that one or more of the first probabilities other than the maximum value are greater than or equal to a second threshold, determining that one or more of the classes represented in the first probability vector are the confusing classes.

The adjusting of the determined first probability vector may include: determining a difference between a predetermined value and the maximum value; determining, for each of the confusing classes, a ratio of the first probability of the confusing class to the determined difference; and adjusting, for each of the confusing classes, the first probability of the confusing class based on the respective ratio.

The performing of the classification may include: determining a similarity between the determined second probability vector and the adjusted first probability vector; and classifying the input as a class having the maximum value in response to the determined similarity being greater than or equal to a second threshold.

The method may include performing a function of a user terminal corresponding to the class having the maximum value, in response to the classifying of the input as the class having the maximum value.

The function may include any one or any combination of any two or more of transmitting function, a playback function, a storing function, a removing function, and a correcting function of the user terminal.

The method may include: determining the input to be an out-of-domain (OOD) of the classification apparatus in response to the determined similarity being less than or equal to the second threshold.

The determining of the first probability vector may include determining the first probability vector using a first classification model, and the determining of the second probability vector may include determining the second probability vector using a second classification model.

The first classification model and the second classification model may share at least a portion of weights.

The input may include any one or any combination of any two or more of a text, a speech, and an image.

A non-transitory computer-readable storage medium may store instructions that, when executed by one or more processors, cause the one or more processors to perform the method of claim 1.

In another general aspect, a processor-implemented classification training method includes: determining, using a trained first classification model, a first probability vector including a first probability, for each of a plurality of classes, resulting from a classification of an input with respect to the classes, wherein one of the classes corresponds to a truth class of the input; determining, based on the determined first probability vector, whether one or more of the classes represented in the first probability vector are confusing classes; adjusting, in response to one or more the classes being the confusing classes, the determined first probability vector based on a first probability of each of the confusing classes and a first probability of the truth class; and training a second classification model based on the adjusted first probability vector and the input.

The determining of whether one or more of the classes represented in the first probability vector are the confusing classes may include: determining whether the first probability of the truth class is less than or equal to a first threshold; and in response to determining that the first probability of the truth class is less than or equal to the first threshold, determining whether one or more of the classes represented in the first probability vector are the confusing classes.

The adjusting of the determined first probability vector may include: determining a difference between a predetermined value and the first probability of the truth class; determining, for each of the confusing classes, a ratio of the first probability of the confusing class to the determined difference; and adjusting, for each of the confusing classes, the first probability of the confusing class based on the respective ratio.

The trained first classification model may be separate from the trained second classification model.

The trained first classification model and the trained second classification model may share at least a portion of weights.

In another general aspect, a classification apparatus includes: one or more processors configured to: determine a first probability vector including a first probability, for each of a plurality of classes, resulting from a classification of an input with respect to the classes; determine, based on the determined first probability vector, whether one or more of the classes represented in the first probability vector are confusing classes; adjust, in response to one or more of the classes being the confusing classes, the determined first probability vector based on a first probability of each of the confusing classes and a maximum value of the first probabilities; determine a second probability vector including a second probability, for each of the classes, resulting from another classification of the input with respect to the classes; and perform classification on the input based on a result of a comparison between the determined second probability vector and the adjusted first probability vector.

For the determining of whether one or more of the classes represented in the first probability vector are the confusing classes, the one or more processors may be configured to: determine whether the maximum value is less than or equal to a first threshold; and in response to determining that the maximum value is less than or equal to the first threshold, determine whether one or more of the classes represented in the first probability vector are the confusing classes.

For the adjusting of the determined first probability vector, the one or more processors may be configured to: determine a difference between a predetermined value and the maximum value; determine, for each of the confusing classes, a ratio of the first probability of the confusing class to the determined difference; and adjust, for each of the confusing classes, the first probability of the confusing class based on the respective ratio.

For the performing of the classification, the one or more processors may be configured to: determine a similarity between the determined second probability vector and the adjusted first probability vector; and classify the input as a class having the maximum value in response to the determined similarity being greater than or equal to a second threshold.

The one or more processors may be configured to determine the input to be an out-of-domain (OOD) of the classification apparatus in response to the determined similarity being less than or equal to the second threshold.

The input may include any one or any combination of any two or more of a text, a speech, and an image.

The apparatus may include a memory storing instructions that, when executed by the one or more processors, configure the one or more processors to perform the determining of the first probability vector, the determining of whether the classes include the confusing classes, the adjusting of the determined first probability vector, the determining of the second probability vector, and the performing of the classification.

In another general aspect, a processor-implemented classification method includes: determining a first probability that an input corresponds to a class and another first probability that the input corresponds to another class; increasing the other first probability, in response to the first probability being a maximum of the first probabilities and being below a threshold; determining a second probability that the input corresponds to the other class; and classifying the input as corresponding to the class in response to a result of a comparison between the increased first probability to the second probability being below another threshold.

Other features and aspects will be apparent from the following detailed description, the drawings, and the claims.

BRIEF DESCRIPTION OF THE DRAWINGS

FIGS. 2 through 4 illustrate examples of an operation of a classification apparatus.

Figure 1:
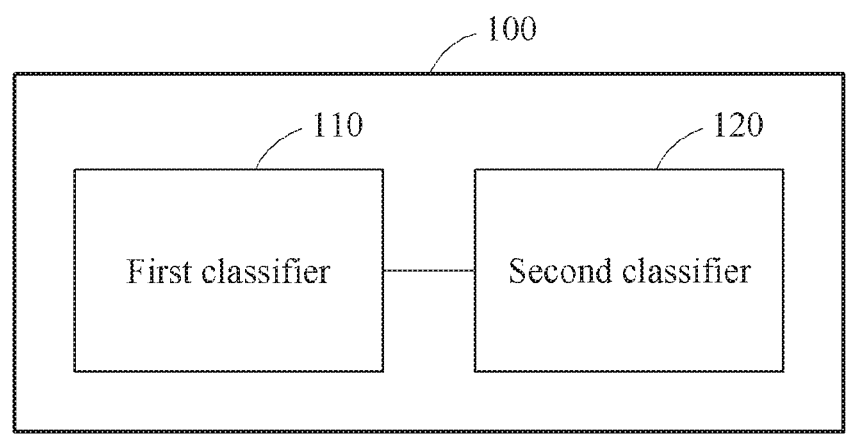
FIG. 1 illustrates an example of a classification apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and after an understanding of the disclosure of this application. It will be further understood that terms, such as those defined in commonly used dictionaries, should be interpreted as having a meaning that is consistent with their meaning in the context of the relevant art and the disclosure of this application, and are not to be interpreted in an idealized or overly formal sense unless expressly so defined herein.

Also, in the description of embodiments, detailed description of well-known related structures or functions will be omitted when it is deemed that such description will cause ambiguous interpretation of the present disclosure.

When an input is received, a typical classifier may calculate a probability, for each of a plurality of classes corresponding to an in-domain, of the input belonging to each class and may compare a maximum value among the calculated probabilities to a threshold $T_{OOD}$ to determine whether the input is of an in-domain and belongs to the class corresponding to the maximum value. However, even though the input may actually belong to the class corresponding to the maximum value, the typical classifier may erroneously determine the input to be an out-of-domain (OOD) when the maximum value is less than the threshold $T_{OOD}$. Due to this, a classification accuracy of typical classifier and the typical classification method may decrease. In an example, an in-domain is a domain of subject matter for which a classifier is configured to classify, and an OOD is a domain of subject matter for which the classifier is not configured to classify, has determined not to classify, and/or has determined cannot be classified. In an example, a classifier has been trained based on inputs of an in-domain and has not been trained based on inputs of an OOD.

FIG. 1 illustrates an example of a classification apparatus.

Referring to FIG. 1, the classification apparatus 100 includes a first classifier 110 and a second classifier 120.

In an example of FIG. 1, the classification apparatus 100 may include two classifiers, the first classifier 110 and the second classifier 120. However, this is merely an example and the classification apparatus 100 may include three or more classifiers, or the classification apparatus 100 may be a single classifier configured to perform the operations of both the first classifier 110 and the second classifier 120.

The first classifier 110 may determine or generates a first probability vector including a first probability for each of plural classes based on an input. The input may include at least one of an image, a speech, or a text, but not be limited thereto.

The first classifier 110 may determine whether the classes include confusing classes based on the determined first probability vector. For example, when a maximum value of the first probabilities of the classes is less than or equal to a threshold $T_{OOD}$, the first classifier 110 may determine that the classes include the confusing classes. In an example, the confusing classes include the classes corresponding to first probabilities great than zero, other than a class corresponding to the maximum value of the first probabilities. For example, even when the maximum value of the first probabilities is less than or equal to a threshold $T_{OOD}$, the classification apparatus 100 may nevertheless determine to perform further operations with respect to the first probabilities of the determined confusing classes, so as to determine whether the input belongs to the class corresponding to the maximum value.

When it is determined that the classes include the confusing classes, the first classifier 110 may adjust the first probability vector. An example of adjusting the first probability vector will be described with reference to FIG. 2.

The second classifier 120 may determine a second probability vector including a second probability for each of the classes based on the input. Related description will be made with reference to FIG. 3.

The second classifier 120 may perform classification on the input based on a result of a comparison between the determined second probability vector and the adjusted first probability vector. Related description will be made with reference to FIG. 4.

Even when the maximum value of the first probabilities of the classes is less than the threshold $T_{OOD}$, the classification apparatus 100 of the present disclosure may determine whether the input corresponds to an out-of-domain (OOD) based on a result of comparison between the determined second probability vector and the adjusted first probability vector, instead of determining that the input corresponds to the OOD in response a maximum value being less than the threshold $T_{OOD}$, as in a typical classification apparatus. Through this, classification of the classification apparatus 100 of the present disclosure may be more accurate than the typical classification apparatus, as the classification apparatus 100 of the present disclosure may avoid erroneously determining that the input corresponds to the OOD in a situation where the maximum value is less than the threshold $T_{OOD}$ yet the input nevertheless does not actually correspond to the OOD.

Figure 2:
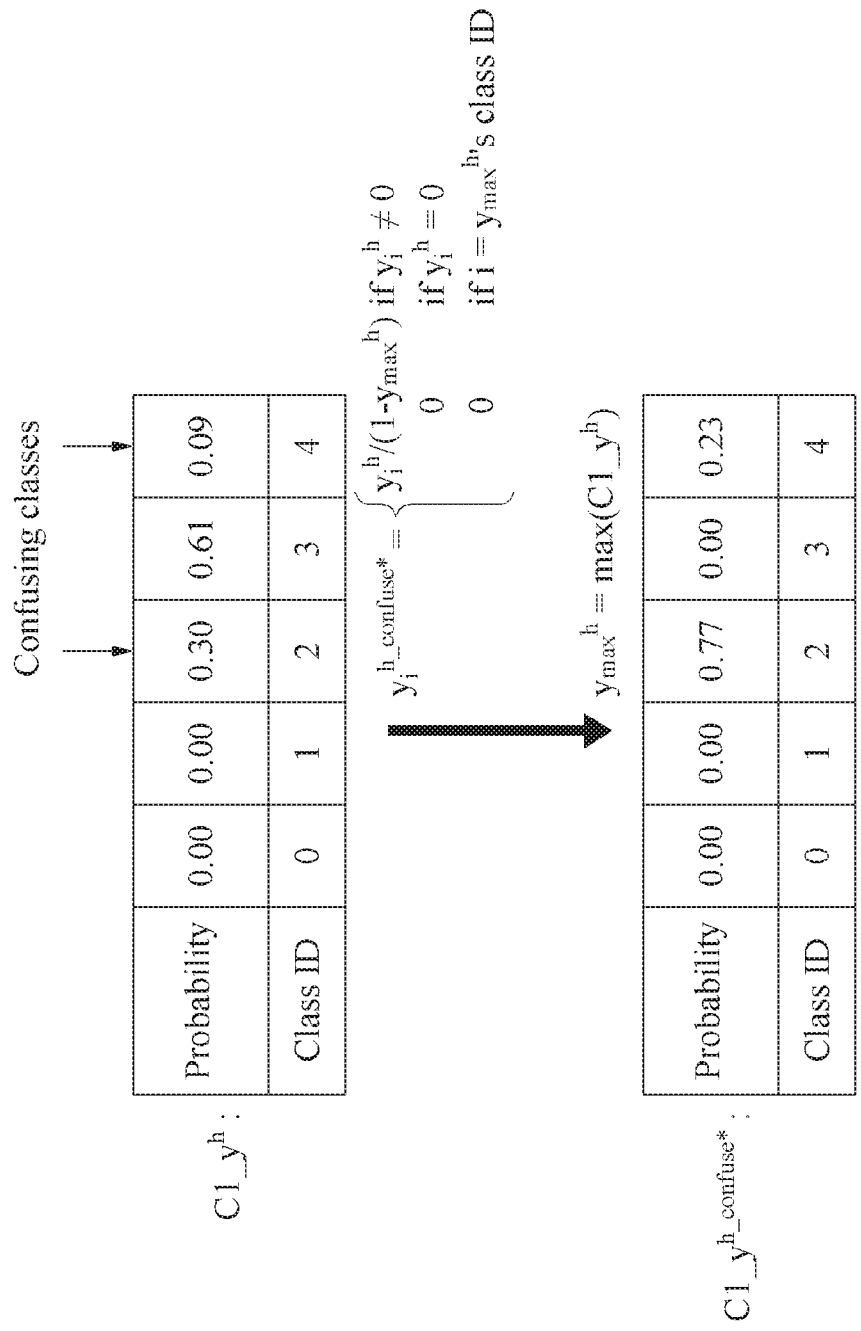
Figure 4:
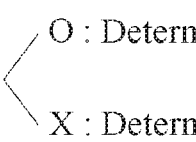

FIGS. 2 through 4 illustrate examples of an operation of a classification apparatus.

The first classifier 110 may include a first classification model based on a neural network. When an input is received, the first classification model may calculate a first probability of each of a plurality of classes, thereby determining or generating a first probability vector. Here, the first probability indicates a probability of the input belonging to each of the classes.

Table 1 shows an example of classes corresponding to an in-domain of the first classification in a case of a gallery application.

TABLE 1

| Class ID | Function mapped to class ID |
|---|---|
| Class 0 | Transmit |
| Class 1 | Play |
| Class 2 | Store |
| Class 3 | Remove |
| Class 4 | Correct |

When an input is a text "remove the picture taken yesterday", the first classification model may calculate a probability of the text belonging to a class ID 0 mapped to a transmitting function, a probability of the text belonging to a class ID 1 mapped to a playback function, a probability of the text belonging to a class ID 2 mapped to a storing function, a probability of the text belonging to a class ID 3 mapped to a removing function, and a probability of the text belonging to a class ID 4 mapped to a correcting function.

Table 1 is merely an example provided for ease of explanation, and the classes are not limited to Table 1.

FIG. 2 illustrates an example of an operation result of a first classification model.

Referring to FIG. 2, a first probability vector [0.00, 0.00, 0.30, 0.61, 0.09] is included in an operation result $C1\_y^h$ of the first classification model. In an example of FIG. 2, the first classification model may calculate a probability of each of a class ID 0 and a class ID 1 to be 0, which may indicate that a probability of an input being classified into each of a class ID 0 and a class ID 1 is zero. The first classification model may calculate a probability of the class ID 2, a probability of the class ID 3, and a probability of the class ID 4 to respectively be 0.3, 0.61, and 0.09, which may indicate that probabilities of an input being classified into the class ID 2, the class ID 3, and the class ID 4 are 0.3, 0.61, and 0.09, respectively.

The first classifier 110 may determine whether the class ID 0 through the class ID 4 include confusing classes. For example, when the first probabilities calculated by the first classification are distributed over classes among the class ID 0 through the class ID 4, the first classifier 110 may determine that the class ID 0 through the class ID 4 include the confusing classes. For example, the first classifier 110 may compare a maximum value of the first probability of the class ID 0 through the class ID 4 to a threshold $T_{OOD}$. When the maximum value is less than the threshold $T_{OOD}$, the first classifier 110 may determine that the class ID 0 through the class ID 4 include the confusing classes. In an example of FIG. 2, when the threshold $T_{OOD}$ is 0.8, 0.61 corresponding to a maximum value is less than the threshold $T_{OOD}$. Thus, the first classifier 110 may determine the class ID 2 having a probability other than zero and the class ID 4 to be confusing classes of the class ID 3 having the maximum value. For example, the first classifier 110 may determine that the first classification model is confused with a class ID corresponding to the input among the class ID 2, the class ID 3, and the class ID 4.

The first classifier 110 may adjust first probabilities of the confusing classes. As illustrated in FIG. 2, the first classifier 110 may adjust first probabilities of the confusing classes according to Equation 1 below, for example.

$$y_i^{h\_confuse*} = \begin{cases} y_i^h/(1 - y_{max}^h) & \text{if } y_i^h \neq 0 \\ 0 & \text{if } y_i^h = 0 \\ 0 & \text{if } i = \text{class ID of } y_{max}^h \end{cases} \quad \text{Equation 1}$$

$$y_{max}^h = \max(C1\_y^h)$$

In Equation 1, i denotes a class ID, $y_i^{h\_confuse*}$ denotes an adjusted first probabilities of classes, and $y_{max}^h$ denotes a maximum value of the first probabilities of the classes.

In an example of FIG. 2, the first classifier 110 may calculate a difference between a predetermined value "1" and a maximum value "0.61". The first classifier 110 may perform a calculation based on the calculated difference "0.39" and the first probability "0.3" of the class ID 2 and adjust the first probability of the class ID 2 to be "0.77". Likewise, the first classifier 110 may perform a calculation based on the calculated difference "0.39" and the first probability "0.09" of the class ID 4 and adjusts the first probability of the class ID 4 to be "0.23". Also, the first classifier 110 may adjust the first probability "0.61" of the class ID 3 to be "0". Through this, the first probability vector may be adjusted to be [0.00, 0.00, 0.77, 0.00, 0.23].

As such, the first classifier 110 may adjust $C1\_y^h$ to be $C1\_y^{h\_confuse*}$ using Equation 1.

The second classifier 120 may include a second classification model based on a neural network. The second classification model may correspond to a model having learned probabilities of confusing classes for a given training input. Training will be described in detail below with reference to FIGS. 5-9 and 11.

The second classification model may be separate from the first classification model. Depending on an implementation, the first classification model and the second classification model may share a portion of or all weights.

When an input is received, the second classification model may calculate a second probability of each of classes, thereby determining or generating a second probability vector. The second probability of each of the classes may be differently expressed as a probability of each of confusing classes. FIG. 3 illustrates an example of an operation result of the second classification model.

Referring to FIG. 3, a second probability vector of [0.00, 0.00, 0.71, 0.00, 0.29] is included in an operation result $C2\_y^h$ of the second classification model. In an example of FIG. 3, the second classification model may calculate second probabilities of the class ID 0 through the class ID 4 to be 0, 0, 0.71, 0, and 0.29, which may indicate that the class ID 2 has a probability of 0.71 as a confusing class and the class ID 4 has a probability of 0.29 as a confusing class.

Referring to FIG. 4, the second classifier 120 may determine whether $C1\_y^{h\_confuse*}$ of FIG. 2 is similar to $C2\_y^h$ of FIG. 3. For example, the second classifier 120 may adjust a similarity or distance between the adjusted first probability vector and the second probability vector.

As an example, the similarity or distance between the adjusted first probability vector and the second probability vector may be a mean squared error (MSE) between the adjusted first probability vector and the second probability vector. The second classifier 120 may determine whether the MSE between the adjusted first probability vector and the second probability vector is less than a predetermined error value. When the MSE between the adjusted first probability vector and the second probability vector is less than the predetermined error value, the second classifier 120 may determine that the adjusted first probability vector is similar to the second probability vector.

As another example, the similarity between the adjusted first probability vector and the second probability vector may be a cross entropy loss between the adjusted first probability vector and the second probability vector. The second classifier 120 may determine whether the cross entropy loss between the adjusted first probability vector and the second probability vector is less than a predetermined loss value. When the cross entropy loss between the adjusted first probability vector and the second probability vector is less than the predetermined loss value, the second classifier 120 may determine that the adjusted first probability vector is similar to the second probability vector. The MSE and the cross entropy loss are merely examples, and the similarity between the adjusted first probability vector and the second probability vector is not limited to the MSE and the cross entropy loss. For example, the second classifier 120 may determine that the adjusted first probability vector is similar to the second probability vector when a difference or a ratio between the adjusted first probability vector and the second probability vector is less than a predetermined value.

When it is determined that $C1\_y^{h\_confuse+}$ is similar to $C2\_y^h$, the second classifier 120 may determine that the input belongs to a class of $max(C1\_y^h)$ (e.g., class="Class ID 3" of $max(C1\_y^h)$="0.61", as shown in FIG. 2). When it is determined that $C1\_y^{h\_confuse+}$ is not similar to $C2\_y^h$, the second classifier 120 may determine the input to be an OOD. For example, when it is determined that the adjusted first probability vector is similar to the second probability vector, the second classifier 120 may classify the input into the class of $max(C1\_y^h)$. Also, when it is determined that the adjusted first probability vector is not similar to the second probability vector, the second classifier 120 may determine the input to be an OOD.

In a typical classification method, when $max(C1\_y^h)$ is less than a threshold $T_{OOD}$, an input may be determined to be an OOD. In contrast, in an example of a classification method of the present disclosure, when $max(C1\_y^h)$ is less than the threshold $T_{OOD}$, the first classifier 110 may not necessarily presume the input to be the OOD. Instead, the first classifier 110 may generate $C1\_y^{h\_confuse+}$ based on $C1\_y^h$. Also, the second classifier 120 may determine that the input belongs to the class of $max(C1\_y^h)$ when $C1\_y^{h\_confuse+}$ is similar to $C2\_y^h$ and may determine the input to be the OOD when $C1\_y^{h\_confuse+}$ is not similar to $C2\_y^h$. Through this, the classification method of the present disclosure may be more accurate than the typical classification method.

When the second classifier 120 determines that the input belongs to the class of $max(C1\_y^h)$, a command corresponding to the class of $max(C1\_y^h)$ may be performed. For example, when the input is "remove the picture taken yesterday" and the class of $max(C1\_y^h)$ is mapped to a removing function as shown in Table 1 above, a system may remove the picture taken by a user yesterday. As another example, when the second classifier 120 determines that the input corresponds to the OOD, an output mapped to the OOD may be provided to the user. For example, when the input is "translate the picture", the second classifier 120 may determine that $C1\_y^{h\_confuse+}$ is not similar to $C2\_y^h$. In this example, the system may output "cannot be executed" to the user. The system will be further described with reference to FIG. 13.

The second classifier 120 determining whether $C1\_y^{h\_confuse+}$ is similar to $C2\_y^h$ and determining whether the input belongs to the class of $max(C1\_y^h)$ or corresponds to the OOD has been described with reference to FIG. 4. Such operation may be performed by the first classifier 110 and may also be performed by another classifier.

Figure 5:
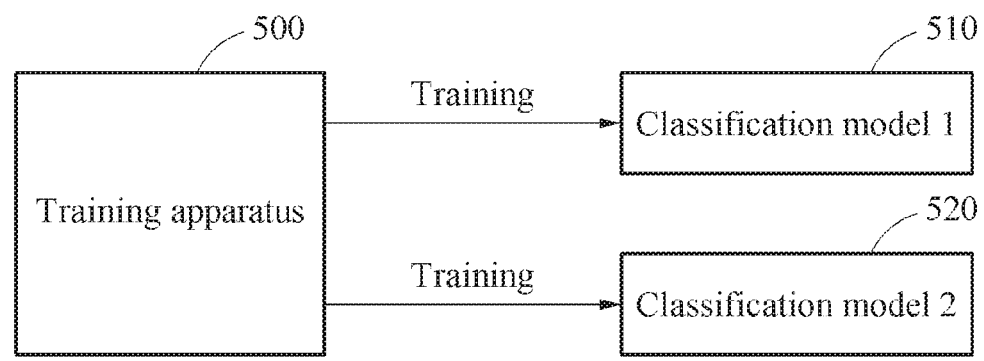
FIG. 5 illustrates an example of a training apparatus.

FIG. 5 illustrates an example of a training apparatus, e.g., the classification apparatus of FIG. 1 or another apparatus.

Referring to FIG. 5, a training apparatus 500 may train a classification model 1 510, and determine and/or generate "first probability vector_training" including first probabilities of classes based on an input and a trained first classification model. Here, one of the classes may correspond to a truth class of the input. In an example, the truth class is a class predetermined to correspond to the input.

The training apparatus 500 may determine whether the classes include confusing classes based on "first probability vector_training". When the classes include confusing classes, the training apparatus 500 may adjust "first probability vector_training" based on a first probability of the truth class and first probabilities of the confusing classes.

The training apparatus 500 may train a classification model 2 520 based on the adjusted "first probability vector_training" and the input. The trained classification model 2 may learn or see the confusing classes of the trained classification model 1.

The trained classification model 1 may correspond to the first classification model described with reference to FIGS. 2 through 4. The trained classification model 2 may correspond to the second classification model described with reference to FIGS. 2 through 4.

Examples of an operation of a training apparatus (e.g., the training apparatus 500) will be described with reference to FIGS. 6 through 8.

Figure 6:
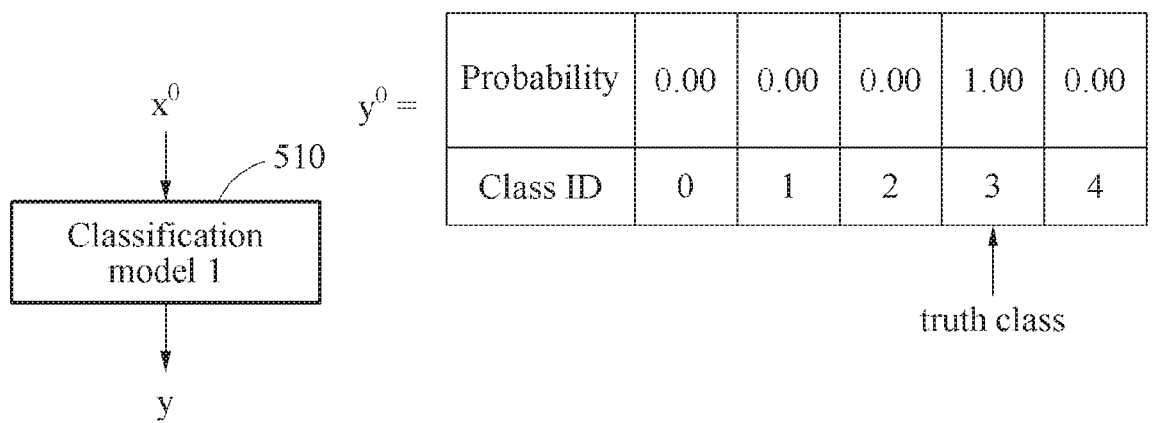
FIGS. 6 through 8 illustrate examples of an operation of a training apparatus.
Figure 7:
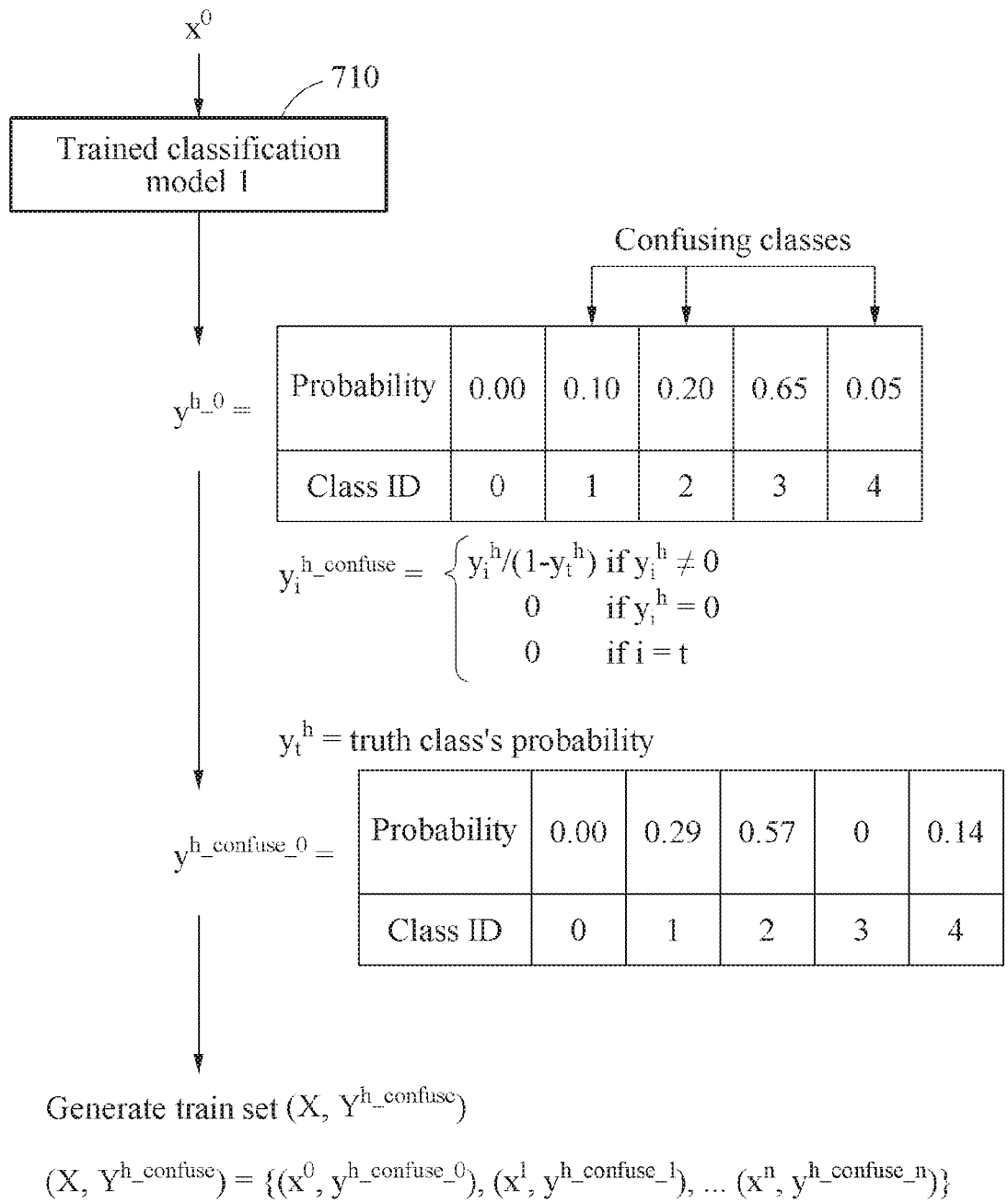
Figure 8:
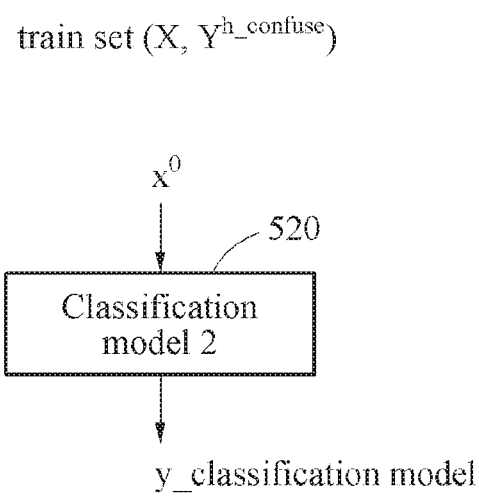

FIGS. 6 through 8 illustrate examples of an operation of a training apparatus.

Referring to FIG. 6, the training apparatus 500 may train the classification model 1 510 based on a train set (X, Y). As illustrated in FIG. 6, the train set (X, Y) may include training pairs $(x_0, y^0), \ldots, (x^n, y^n)$.

In an example of FIG. 6, a class ID 3 in $y^0$ is a truth class of an input $x^0$. In this example, the training apparatus 500 may train the classification model 1 510 such that the class ID 3 has a probability of 1 and remaining classes have a probability of 0. For example, the training apparatus 500 may train the classification model 1 510 such that an output y of the classification model 1 510 is substantially the same as $y^0$. Depending on an implementation, the training apparatus 500 may train the classification model 1 510 such that the class ID 3 has a probability of 0.9 and each of the remaining classes has "0.1/the number of the remaining classes".

The training apparatus 500 may train the classification model 1 510 based on at least one other training pair in addition to $(x^0, y^0)$.

Referring to FIG. 7, the training apparatus 500 may input $x^0$ to a trained classification model 1 710.

In response to $x^0$ being input, the trained classification model 1 710 may calculate a first probability of each of a class ID 0 through a class ID 4 and outputs $y^{h\_0}$. Here, $y^{h\_0}$ may include "first probability vector_training" [0.00, 0.10, 0.20, 0.65, 0.05].

The training apparatus 500 may determine whether the class ID 0 through the class ID 4 include confusing classes. For example, the training apparatus 500 may compare a maximum value of first probabilities of the class ID 0 through the class ID 4 to a threshold $T_{OOD}$. In an example of FIG. 7 wherein the threshold $T_{OOD}$ is 0.8, a maximum value "0.65" is less than the threshold $T_{OOD}$. Thus, the training apparatus 500 may determine the class ID 1, the class ID 2, and the class ID 4 having probabilities other than zero, to be confusing classes of the truth class.

When the confusing classes are present, the training apparatus 500 may adjust $y^{h\_0}$ to be $y^{h\_confuse\_0}$ using Equation 2 below, for example.

$$y_i^{h\_confuse} = \begin{cases} y_i^h/(1-y_t^h) & \text{if } y_i^h \neq 0 \\ 0 & \text{if } y_i^h = 0 \\ 0 & \text{if } i = t \end{cases} \quad \text{Equation 2}$$

$y_t^h$ = probability of the truth class

In Equation 2, i denotes a class ID and $y_i^{h\_confuse}$ denotes an adjusted first probability of each class.

In an example of FIG. 7, the training apparatus 500 may calculate a difference between a predetermined value "1" and a first probability "0.65" of the truth class. The training apparatus 500 may adjust the first probability of the class ID 1 to be 0.29 based on the calculated difference "0.35" and the first probability "0.1" of the class ID 1 (e.g., by dividing "0.1" by "0.35" according to Equation 2). Likewise, the training apparatus 500 may adjust the first probability of the class ID 2 to be 0.57 and adjust the first probability of the class ID 4 to be 0.14. Also, the training apparatus 500 may adjust the first probability of the class ID 3 corresponding to the truth class to be zero. Through this, using Equation 2, the first probability vector_training may be adjusted to be [0.00, 0.29, 0.57, 0, 0.14].

When $y^{h\_0}$ is adjusted to $y^{h\_confuse\_0}$, the training apparatus 500 may generate a training pair of $(x^0, y^{h\_confuse\_0})$. Likewise, the training apparatus 500 may generate training pairs of $(x_1, y^{h\_confuse\_1}), \ldots, (x^n, y^{h\_confuse\_n})$. The training pairs of $(x_0, y^{h\_confuse\_0})$ through $(x^n, y^{h\_confuse\_n})$ may also be referred to as a train set $(X, Y^{h\_confuse})$.

The train set $(X, Y^{h\_confuse})$ may be used for the training apparatus 500 to train the classification model 2 520.

Referring to FIG. 8, the training apparatus 500 may train the classification model 2 520 based on the train set $(X, Y^{h\_confuse})$. For example, the training apparatus 500 may input $x^0$ to the classification model 2 520, and train the classification model 2 520 such that the classification model 2 520 outputs $y^{h\_confuse\_0}$. Likewise, the training apparatus 500 may input $x^1$ to the classification model 2 520, and train the classification model 2 520 such that the classification model 2 520 outputs $y^{h\_confuse\_1}$. When $x^n$ is input the classification model 2 520, the training apparatus 500 may train the classification model 2 520 such that the classification model 2 520 output $y^{h\_confuse\_n}$.

In an example, the trained classification model 1 710 may be a model separate from the trained classification model 2, or may share a portion of or all weights with the trained classification model 2.

Figure 9:
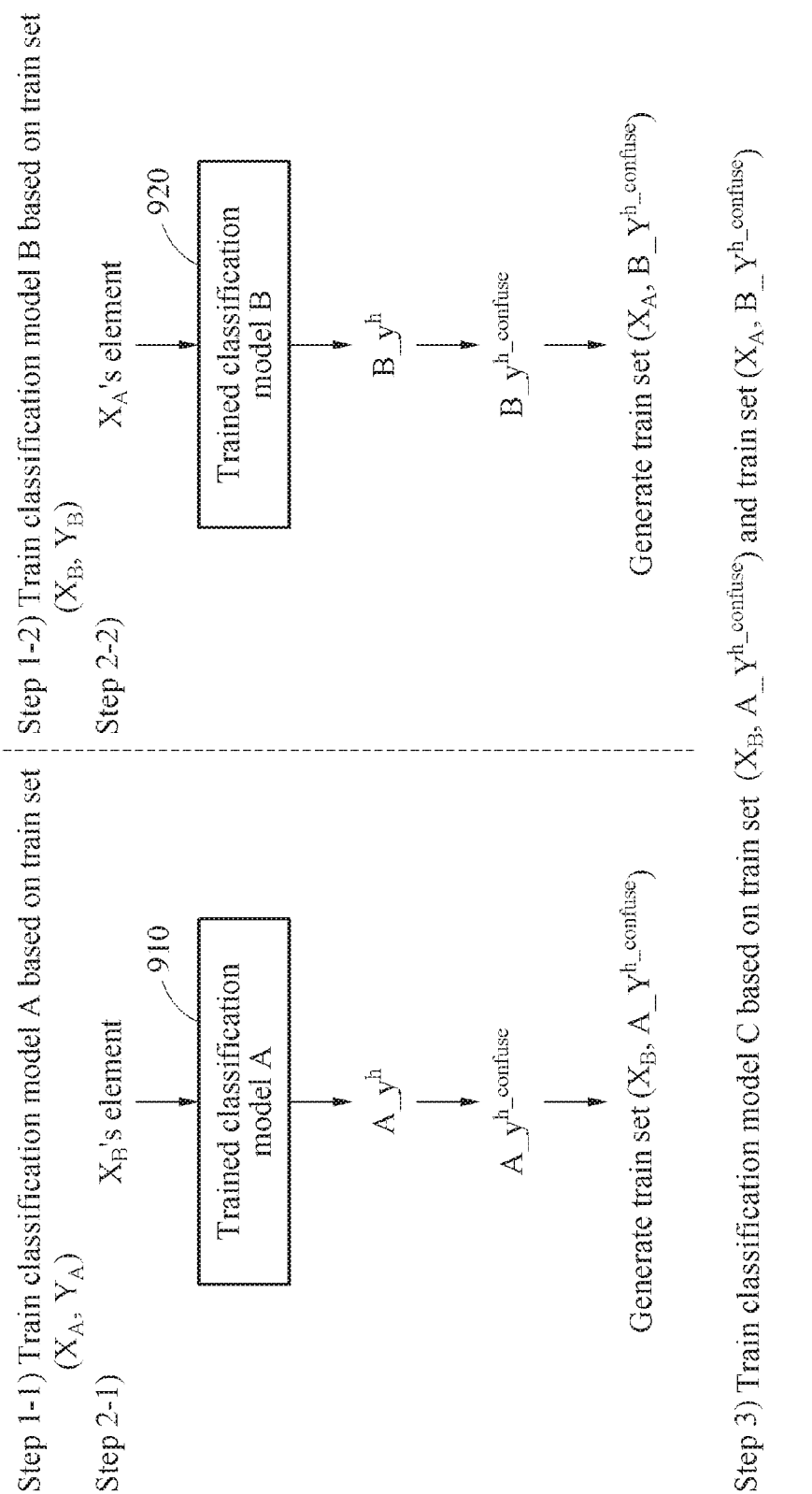
FIG. 9 illustrates an example of an operation of a training apparatus.

FIG. 9 illustrates an example of an operation of a training apparatus.

Referring to FIG. 9, X of the train set (X, Y) of FIG. 6 may be divided into $X_A$ and $X_B$, and Y may be divided into $Y_A$ and $Y_B$. As illustrated in FIG. 9, $X_A$ includes elements $x^0$ through $x^\alpha$, $X_B$ includes elements $x^{\alpha+1}$ through $x^n$, $Y_A$ includes elements $y^0$ through $y^\alpha$, and $Y_B$ includes elements $y^{\alpha+1}$ through $y^n$.

The training apparatus 500 may train a classification model A based on a train set $(X_A, Y_A)$, and input $x^{\alpha+1}$ included in $X_B$ to a trained classification model A 910. In response to $x^{\alpha+1}$ being input, the trained classification model A 910 may calculate a first probability of each class and outputs $A\_y^{h\_\alpha+1}$. The training apparatus 500 may adjust $A\_y^{h\_\alpha+1}$ to be $A\_y^{h\_confuse\_\alpha+1}$ using Equation 2, and generate a training pair of $(x^{\alpha+1}, A\_y^{h\_confuse\_\alpha+1})$. Likewise, the training apparatus 500 may generate training pairs of $(x^{\alpha+2}, A\_y^{h\_confuse\_\alpha+2})$ through $(x^n, A\_y^{h\_confuse\_n})$.

$(x^{\alpha+1}, A\_y^{h\_confuse\_\alpha+1})$ through $(x^n, A\_y^{h\_confuse\_n})$ may also be referred to as a train set $(X^B, A\_Y^{h\_confuse})$.

The training apparatus 500 may train a classification model B based on the train set $(X_B, Y_B)$ and input $x^0$ included in $X_A$ to a trained classification model B 920. In response to $x^0$ being input, the trained classification model B 920 may calculate a first probability of each class and outputs $B\_y^{h\_0}$. The training apparatus 500 may adjust $B\_y^{h\_0}$ to be $B\_y^{h\_confuse\_0}$ using Equation 2 and generate a training pair of $(x^0, B\_y^{h\_confuse\_0})$. Likewise, the training apparatus 500 may generate training pairs of $(x^1, B\_y^{h\_confuse\_1})$ through $(x^\alpha, B\_y^{h\_confuse\_\alpha})$.

$(x^0, B\_y^{h\_confuse\_0})$ through $(x^\alpha, B\_y^{h\_confuse\_\alpha})$ may also be referred to as a train set $(X^A, B\_y^{h\_confuse})$.

The training apparatus 500 may train a classification model C based on the train set $(X^B, A\_Y^{h\_confuse})$. Through this, the classification model C may learnsee, and/or classify classes that the trained classification model A 910 is confused with. Also, the training apparatus 500 may train the classification model C based on the train set $(X^A, B\_y^{h\_confuse})$. Through this, the classification model C may learn, see, and/or classify classes that the trained classification model B 920 is confused with.

In an example, the trained classification models A, B, and C may be embodied in the classification apparatus 100. In another example, the trained classification models A, B, and C may be embodied in the first classification model and the second classification model described above.

Figure 10:
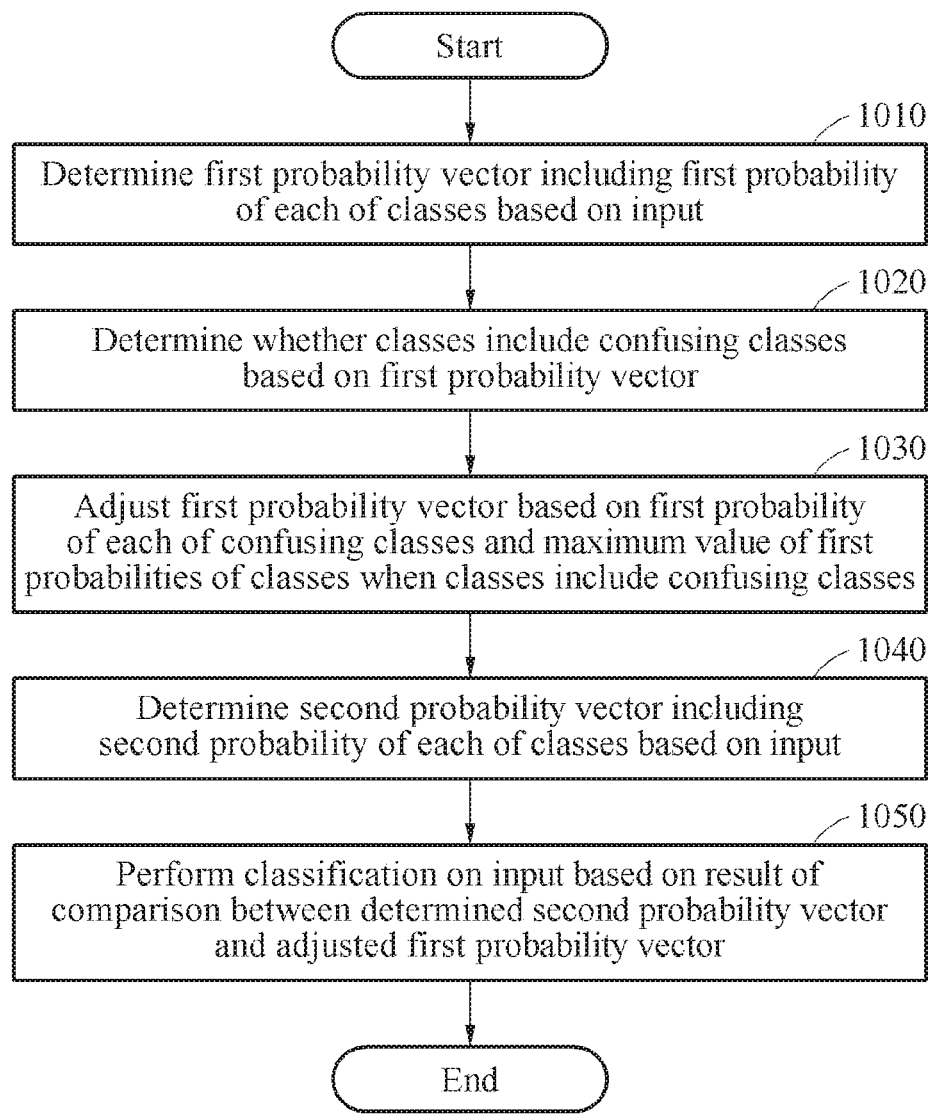
FIG. 10 is a flowchart illustrating an example of a classification method.

FIG. 10 is a flowchart illustrating an example of a classification method (e.g., a classification method of a classification apparatus).

Referring to FIG. 10, in operation 1010, the classification apparatus 100 may determine a first probability vector including a first probability of each of classes based on an input. For example, a first classification model in the classification apparatus 100 may calculate a first probability of each of classes in response to an input being received and output the first probability vector.

In operation 1020, the classification apparatus may 100 determine whether the classes include confusing classes based on the determined first probability vector. For example, when a maximum value of the first probability of each of the classes is less than zero, the classification apparatus 100 may determine classes having a probability other than zero to be the confusing classes.

In operation 1030, when the classes include the confusing classes, the classification apparatus 100 may adjust the determined first probability vector based on a first probability of each of the confusing classes and a maximum value of the first probabilities of the classes.

In operation 1040, the classification apparatus 100 may determine a second probability vector including a second probability of each of the classes based on the input. FIG. 10 illustrates that operation 1040 may be performed after operation 1030, but this is merely an example, and operation 1040 may be performed independently of, and/or before, operation 1030.

In operation 1050, the classification apparatus 100 may perform classification on the input based on a result of comparison between the determined second probability vector and the adjusted first probability vector. For example, when the adjusted first probability vector is similar to the second probability vector, the classification apparatus 100 may classifie the input into a class having the maximum value. When the adjusted first probability vector is not similar to the second probability vector, the classification apparatus 100 may determine that the input corresponds to an OOD.

The classification apparatus 100 may be applied to various fields (for example, speech recognition, character recognition, human recognition, fingerprint recognition, object recognition, and the like) in which classification is required.

Since the description of FIGS. 1 through 9 is applicable examples of FIG. 10, repeated description will be omitted.

Figure 11:
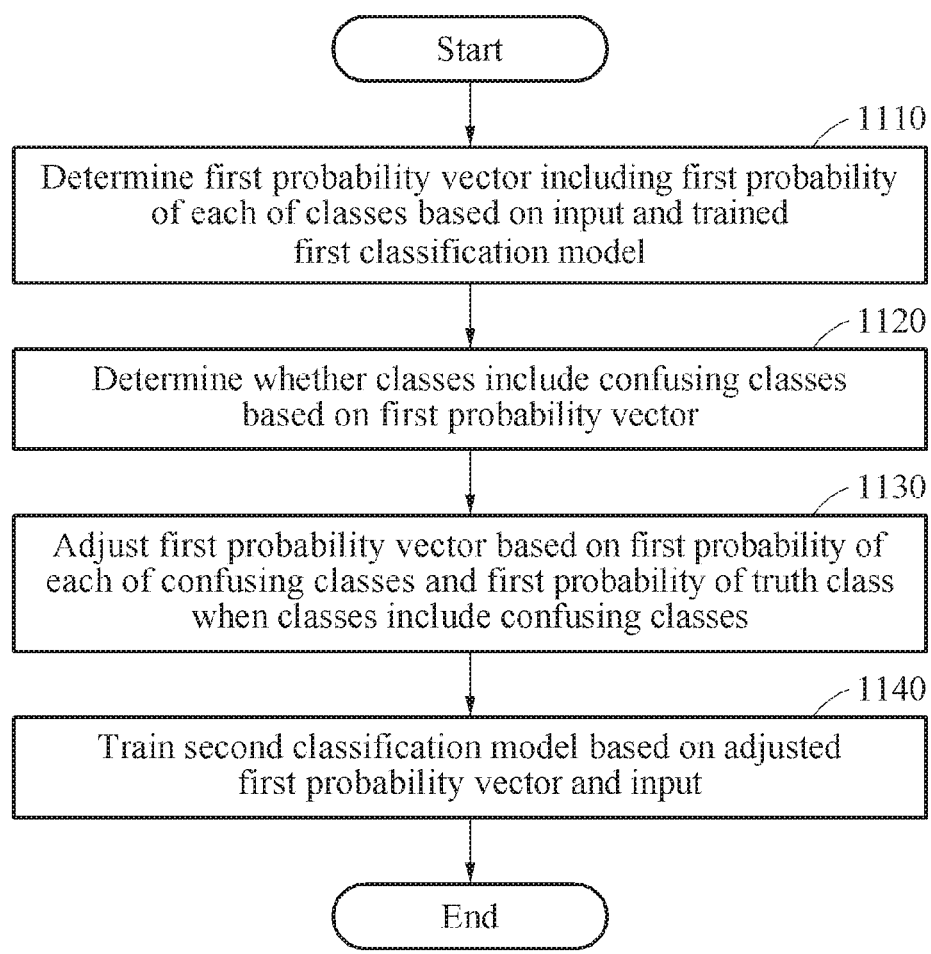
FIG. 11 illustrates an example of a classification training method.

FIG. 11 illustrates an example of a classification training method (e.g., a classification training method of a training apparatus).

Referring to FIG. 11, in operation 1110, the training apparatus 500 may determine a first probability vector including a first probability of each of classes based on an input and a trained first classification model. Here. the first probability vector may correspond to "first probability vector_training" described with reference to FIGS. 5 through 8, and one of the classes may correspond to a truth class of the input.

In operation 1120, the training apparatus 500 may determine whether the classes include confusing classes based on the determined first probability vector.

In operation 1130, when the classes include the confusing classes, the training apparatus 500 may adjust the determined first probability vector based on a first probability of each of the confusing classes and a first probability of the truth class.

In operation 1140, the training apparatus 500 may train a second classification model based on the adjusted first probability vector and the input.

Since the description of FIGS. 1 through 10 is applicable examples of FIG. 11, repeated description will be omitted.

Figure 12:
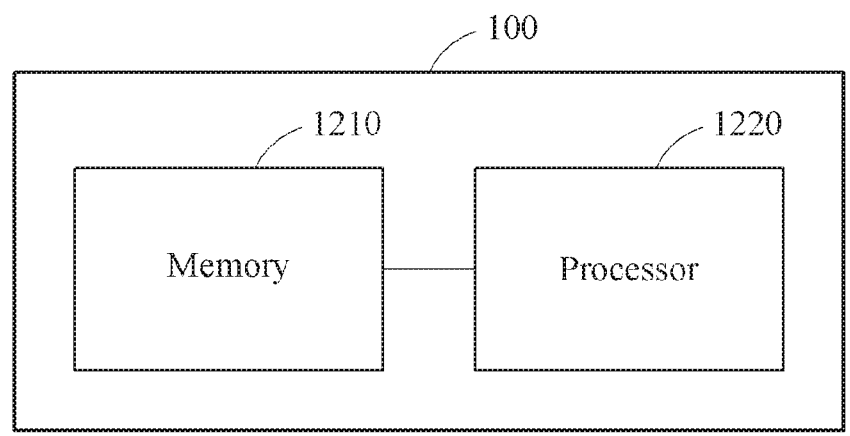
FIG. 12 is a block diagram illustrating an example of a classification apparatus.

FIG. 12 is a block diagram illustrating an example of a classification apparatus.

Referring to FIG. 12, the classification apparatus 100 may include a memory 1210 and a processor 1220 (e.g., one or more processors).

The memory 1210 may store instructions.

The processor 1220 may execute the instructions. In response to the instructions being executed, the processor 1220 may determine a first probability vector including a first probability of each of classes based on an input, determine whether the classes include confusing classes based on the determined first probability vector, and adjust, when the classes include the confusing classes, the determined first probability vector based on a first probability of each of the confusing classes and a maximum value of the first probabilities of the classes. In addition, the processor 1220 may determine a second probability vector including a second probability of each of the classes based on the input. Also, the processor 1220 may perform classification on the input based on a result of comparison between the determined second probability vector and the adjusted first probability vector.

Since the description of FIGS. 1 through 11 is applicable examples of FIG. 12, repeated description will be omitted.

Figure 13:
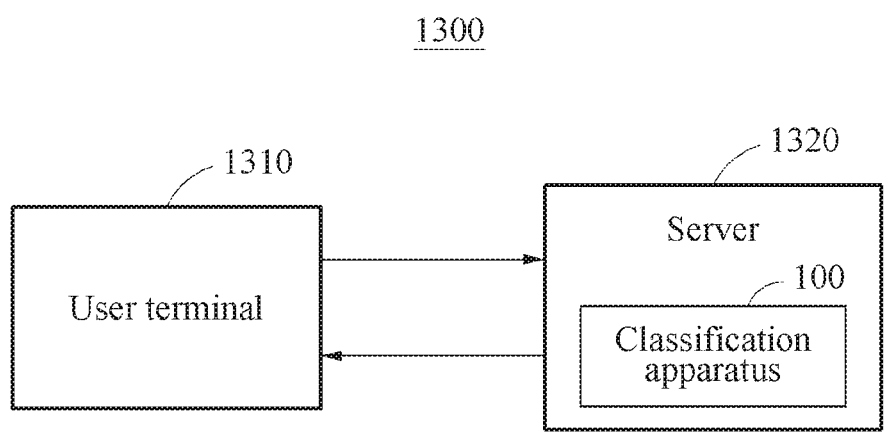
FIG. 13 illustrates an example of a performance system including a classification apparatus.

FIG. 13 illustrates an example of a performance system including a classification apparatus.

Referring to FIG. 13, a system 1300 may include a user terminal 1310 and a server 1320. The system 1300 may implement any one or combination of speech recognition, character recognition, human recognition, fingerprint recognition, and object recognition.

The classification apparatus 100 may be included in the server 1320.

A user may perform utterance toward the user terminal 1310. In response, the user terminal 1310 may receive a speech signal. For example, the user terminal 1310 may receive a speech signal of "remove the picture taken yesterday" from the user.

The user terminal 1310 may preprocess the speech signal and transmit the preprocessed speech signal to the server 1320.

The server 1320 may include a speech recognition engine. The speech recognition engine may generates a text "remove the picture taken yesterday" from the preprocessed speech signal.

The classification apparatus 100 may receive the text "remove the picture taken yesterday", and generate a first probability vector including a first probability of each of classes based on the text. The classes may include, for example, any one of or any combination of a class corresponding to a transmitting function, a class corresponding to a removing function, and a class corresponding to a correcting function. The classification apparatus 100 may calculate the first probability of each of the classes in response to the text being input. Among the first probabilities of the classes, a first probability of a class ID 3 may be a highest probability.

The classification apparatus 100 may determine whether the first probability of the class ID 3 is less than or equal to a threshold $T_{OOD}$. When the first probability of the class ID 3 is greater than or equal to the threshold $T_{OOD}$, the classification apparatus 100 may classify the text into the class ID 3, so that the server 1320 allows a function corresponding to the class ID 3 to be performed in the user terminal 1310. For example, when the first probability of the class ID 3 is greater than or equal to the threshold $T_{OOD}$ and the function mapped to the class ID 3 is removal, the classification apparatus may 100 classify an intent of the user as a picture removal, so that the server 1320 allows the picture taken yesterday to be removed from the user terminal 1310.

The first probability of the class ID 3 may be less than the threshold $T_{OOD}$. The classification apparatus 100 may operate based on the aforementioned classification method, thereby determining a similarity between the second probability vector and the adjusted first probability vector. When the second probability vector is similar to the adjusted first probability vector, the classification apparatus may 100 classify the text into the class ID 3. When the second probability vector is not similar to the adjusted first probability vector, the classification apparatus 100 may determine that the text corresponds to an OOD. In this example, the server 1320 may transmit "cannot perform the function" to the user terminal 1310, so that the user terminal 1310 may output "cannot perform the function".

Since the description of FIGS. 1 through 12 is applicable examples of FIG. 13, repeated description will be omitted.

The classification apparatuses, classification apparatus 100, classifiers, classifier 110, classifier 120, training apparatuses, training apparatus 500, classification models, classification model 510, classification model 520, memories, memory 1210, processors, processor 1220, systems, system 1300, user terminals, user terminal 1310, servers, server 1320, and other apparatuses, units, modules, devices, and components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented classification method, the method comprising:
   determining a first probability vector including a first probability, for each of a plurality of classes, resulting from a classification of an input with respect to the classes;
   determining, based on the determined first probability vector, whether one or more of the classes represented in the first probability vector are confusing classes;
   adjusting, in response to one or more of the classes being the confusing classes, the determined first probability vector based on a first probability of each of the confusing classes and a maximum value of the first probabilities;
   determining a second probability vector including a second probability, for each of the classes, resulting from another classification of the input with respect to the classes; and
   performing classification on the input based on a result of a comparison between the determined second probability vector and the adjusted first probability vector.

2. The method of claim 1, wherein the determining of whether one or more of the classes represented in the first probability vector are the confusing classes comprises:
   determining whether the maximum value is less than or equal to a first threshold; and
   in response to determining that the maximum value is less than or equal to the first threshold, determining whether one or more of the classes represented in the first probability vector are the confusing classes.

3. The method of claim 2, wherein the confusing classes are classes corresponding to first probabilities of the first feature vector that are greater than zero, other than a class corresponding to the maximum value.

4. The method of claim 1, wherein the determining of whether one or more of the classes represented in the first probability vector are the confusing classes comprises:
   determining whether one or more of the first probabilities of the first feature vector, other than the maximum value, are greater than or equal to a second threshold; and
   in response to determining that one or more of the first probabilities other than the maximum value are greater than or equal to a second threshold, determining that one or more of the classes represented in the first probability vector are the confusing classes.

5. The method of claim 1, wherein the adjusting of the determined first probability vector comprises:
   determining a difference between a predetermined value and the maximum value;
   determining, for each of the confusing classes, a ratio of the first probability of the confusing class to the determined difference; and
   adjusting, for each of the confusing classes, the first probability of the confusing class based on the respective ratio.

6. The method of claim 1, wherein the performing of the classification comprises:
   determining a similarity between the determined second probability vector and the adjusted first probability vector; and
   classifying the input as a class having the maximum value in response to the determined similarity being greater than or equal to a second threshold.

7. The method of claim 6, further comprising performing a function of a user terminal corresponding to the class having the maximum value, in response to the classifying of the input as the class having the maximum value.

8. The method of claim 7, wherein the function includes any one or any combination of any two or more of transmitting function, a playback function, a storing function, a removing function, and a correcting function of the user terminal.

9. The method of claim 6, further comprising:
   determining the input to be an out-of-domain (OOD) of the classification apparatus in response to the determined similarity being less than or equal to the second threshold.

10. The method of claim 1, wherein
    the determining of the first probability vector comprises determining the first probability vector using a first classification model, and
    the determining of the second probability vector comprises determining the second probability vector using a second classification model.

11. The method of claim 10, wherein the first classification model and the second classification model share at least a portion of weights.

12. The operation method of claim 1, wherein the input includes any one or any combination of any two or more of a text, a speech, and an image.

13. A non-transitory computer-readable storage medium storing instructions that, when executed by one or more processors, cause the one or more processors to perform the method of claim 1.

14. A processor-implemented classification training method, the method comprising:
    determining, using a trained first classification model, a first probability vector including a first probability, for each of a plurality of classes, resulting from a classification of an input with respect to the classes, wherein one of the classes corresponds to a truth class of the input;
    determining, based on the determined first probability vector, whether one or more of the classes represented in the first probability vector are confusing classes;
    adjusting, in response to one or more the classes being the confusing classes, the determined first probability vector based on a first probability of each of the confusing classes and a first probability of the truth class; and
    training a second classification model based on the adjusted first probability vector and the input.

15. The method of claim 14, wherein the determining of whether one or more of the classes represented in the first probability vector are the confusing classes comprises:
    determining whether the first probability of the truth class is less than or equal to a first threshold; and
    in response to determining that the first probability of the truth class is less than or equal to the first threshold, determining whether one or more of the classes represented in the first probability vector are the confusing classes.

16. The method of claim 14, wherein the adjusting of the determined first probability vector comprises:

determining a difference between a predetermined value and the first probability of the truth class;

determining, for each of the confusing classes, a ratio of the first probability of the confusing class to the determined difference; and adjusting, for each of the confusing classes, the first probability of the confusing class based on the respective ratio.

17. The method of claim 14, wherein the trained first classification model is separate from the trained second classification model.

18. The method of claim 14, wherein the trained first classification model and the trained second classification model share at least a portion of weights.

19. A classification apparatus comprising:
one or more processors configured to:
determine a first probability vector including a first probability, for each of a plurality of classes, resulting from a classification of an input with respect to the classes;

determine, based on the determined first probability vector, whether one or more of the classes represented in the first probability vector are confusing classes;

adjust, in response to one or more of the classes being the confusing classes, the determined first probability vector based on a first probability of each of the confusing classes and a maximum value of the first probabilities;

determine a second probability vector including a second probability, for each of the classes, resulting from another classification of the input with respect to the classes; and perform classification on the input based on a result of a comparison between the determined second probability vector and the adjusted first probability vector.

20. The apparatus of claim 19, wherein, for the determining of whether one or more of the classes represented in the first probability vector are the confusing classes, the one or more processors are configured to:
determine whether the maximum value is less than or equal to a first threshold; and
in response to determining that the maximum value is less than or equal to the first threshold, determine whether one or more of the classes represented in the first probability vector are the confusing classes.

21. The apparatus of claim 19, wherein, for the adjusting of the determined first probability vector, the one or more processors are configured to:

determine a difference between a predetermined value and the maximum value;

determine, for each of the confusing classes, a ratio of the first probability of the confusing class to the determined difference; and adjust, for each of the confusing classes, the first probability of the confusing class based on the respective ratio.

22. The apparatus of claim 19, wherein, for the performing of the classification, the one or more processors are configured to:
determine a similarity between the determined second probability vector and the adjusted first probability vector; and
classify the input as a class having the maximum value in response to the determined similarity being greater than or equal to a second threshold.

23. The apparatus of claim 22, wherein the one or more processors are configured to determine the input to be an out-of-domain (OOD) of the classification apparatus in response to the determined similarity being less than or equal to the second threshold.

24. The apparatus of claim 19, wherein the input includes any one or any combination of any two or more of a text, a speech, and an image.

25. The apparatus of claim 19, further comprising a memory storing instructions that, when executed by the one or more processors, configure the one or more processors to perform the determining of the first probability vector, the determining of whether the classes include the confusing classes, the adjusting of the determined first probability vector, the determining of the second probability vector, and the performing of the classification.

26. A processor-implemented classification method, the method comprising:
determining a first probability that an input corresponds to each of a plurality of classes;
determining, based on a result of a comparison between a maximum value of the first probabilities and a threshold, whether one or more of the plurality of classes are confusing classes;
increasing a first probability of each of the confusing classes based on the first probability of each of the confusing classes and the maximum value;
determining a second probability that the input corresponds to the each of the confusing classes; and
classifying the input as a class having the maximum value based on a result of a comparison between the increased first probabilities to the second probabilities.

* * * * *